(12) United States Patent
Souchkov

(10) Patent No.: US 8,766,930 B2
(45) Date of Patent: *Jul. 1, 2014

(54) CAPACITIVE TOUCHSCREEN SYSTEM WITH DRIVE-SENSE CIRCUITS

(75) Inventor: Vitali Souchkov, Walnut Creek, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 893 days.

This patent is subject to a terminal disclaimer.

(21) Appl. No.: 12/792,682

(22) Filed: Jun. 2, 2010

(65) Prior Publication Data
US 2011/0298745 A1    Dec. 8, 2011

(51) Int. Cl.
*G06F 3/041*    (2006.01)
(52) U.S. Cl.
USPC ........................................ 345/173; 178/18.06
(58) Field of Classification Search
USPC ............. 345/156, 173–178; 178/18.03, 18.06
See application file for complete search history.

(56) References Cited

U.S. PATENT DOCUMENTS

| | | | |
|---|---|---|---|
| 5,543,588 A * | 8/1996 | Bisset et al. | 178/18.06 |
| 5,914,710 A * | 6/1999 | Chen et al. | 345/179 |
| 6,249,606 B1 * | 6/2001 | Kiraly et al. | 382/195 |
| 7,154,481 B2 | 12/2006 | Cross et al. | |
| 2007/0109274 A1 * | 5/2007 | Reynolds | 345/173 |
| 2008/0246496 A1 | 10/2008 | Hristov et al. | |
| 2008/0278178 A1 | 11/2008 | Philipp | |
| 2009/0273579 A1 * | 11/2009 | Zachut et al. | 345/174 |
| 2009/0295754 A1 * | 12/2009 | Chen | 345/175 |
| 2010/0026655 A1 | 2/2010 | Harley | |
| 2010/0149110 A1 * | 6/2010 | Gray | 345/173 |
| 2010/0309162 A1 * | 12/2010 | Nakanishi et al. | 345/174 |
| 2011/0011717 A1 * | 1/2011 | Lin et al. | 200/600 |

FOREIGN PATENT DOCUMENTS

WO    WO 2009/007704    1/2009

* cited by examiner

*Primary Examiner* — Chanh Nguyen
*Assistant Examiner* — Ram Mistry
(74) *Attorney, Agent, or Firm* — Winston Hsu; Scott Margo

(57) ABSTRACT

Disclosed herein are various embodiments of a capacitive touchscreen system that is capable of sensing simultaneous or near-simultaneous multiple finger touches made on a capacitive touchscreen. In one embodiment, drive-sense circuits operably connected to X and Y lines of the touchscreen may be interchangeably and selectably configured as either sense circuits or drive circuits by a drive/sense processor operably connected thereto.

38 Claims, 11 Drawing Sheets

CAPACITIVE TOUCHSCREEN SYSTEM WITH DRIVE-SENSE CIRCUITS

RELATED APPLICATION

This patent application incorporates by reference herein in its entirety U.S. patent application Ser. No. 12/792,670 filed Jun. 2, 2010 entitled "Capacitive Touchscreen System with Multiplexers" to Vitali Souchkov.

FIELD OF THE INVENTION

Various embodiments of the invention described herein relate to the field of capacitive sensing input devices generally, and more specifically to multiple simultaneous or near-simultaneous touch mutual capacitance measurement or sensing systems, devices, components and methods finding particularly efficacious applications in touchscreens underlain by LCD displays or other types of image displays.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded, object is a finger. The human body is essentially a capacitor to a surface where the electric field vanishes, and typically has a capacitance of around 100 pF.

Electrodes in self-capacitance touchpads are typically arranged in rows and columns. By scanning first rows and then columns the locations of individual disturbances induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair at al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE.™ In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field, lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems. Moreover, it is possible to measure a grid of n×n in intersections with only 2n pins on an IC.

It is well known that accurately simultaneously or near-simultaneously the locations of multiple finger touches on a capacitive touchscreen is difficult, and frequently unsuccessful.

What is needed is a capacitive measurement system that may be employed in touchscreen and touchpad applications that is capable of accurately, reliably and quickly distinguishing between multiple simultaneous or near-simultaneous touches on a capacitive touchscreen.

SUMMARY

In one embodiment, there is a provided a capacitive touchscreen system comprising a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers brought into proximity thereto, first drive-sense circuits, one each of such first drive-sense circuits being operably connectable to a corresponding one of the first plurality of traces by switching circuitry, each first drive-sense circuit being operably connectable to its corresponding trace and to a first amplifier, a first capacitor being operably connected to a first negative input and a first output of the first amplifier, and to a first comparator operably connected to the first output of the first amplifier, second drive-sense circuits, one each of such second drive-sense circuits being operably connectable to a corresponding one of the second, plurality of traces by switching circuitry, each second drive-sense circuit being operably connectable to its corresponding trace and a second amplifier, a second capacitor being operably connected to a second negative input and a second output of the second amplifier, and to a second comparator operably connected to the second output of the second amplifier, and a drive/sense processor operably connected to the first and second drive-sense circuits, respectively, and configured: (a) to control the first plurality of first drive-sense circuits to drive at least some of the first plurality of traces and to control the second plurality of second drive-sense circuits to sense at least some of the mutual capacitances through the second plurality of traces, and (b) to control the second drive-sense circuits to drive at least some of the second plurality of traces and to control the first drive-sense circuits to sense at least some of the mutual capacitances through the first plurality of traces.

In another embodiment, there is provided a method of detecting touches on a capacitive touchscreen system comprising a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitance existing between the first and second pluralities of traces at locations where the first and second pluralities of traces intersect, such mutual capacitances changing in the presence of one or more fingers brought into proximity thereto, first drive-sense circuits, one each of such first drive-sense circuits being operably connectable to a corresponding one of the first plurality of traces by switching circuitry, each first drive-sense circuit being operably connectable to its corresponding trace and to a first amplifier, a first capacitor being operably connected to a first negative input and a first output of the first amplifier, and to a first comparator operably connected to the first output of the first amplifier, second drive-sense circuits, one each of such second drive-sense circuits being operably connectable to a corresponding one of the second plurality of traces by switching circuitry, each second drive-sense circuit being operably connectable to its corresponding trace and a second amplifier, a second capacitor being operably connected to a second negative input and a second output of the second amplifier, and to a second comparator operably connected to the second output of the second amplifier, and a drive/sense processor operably connected to the first and second drive-sense circuits, respectively, and configured: (i) to control the first drive-sense circuits to drive at least some of the first plurality of traces and to control the second drive-sense circuits to sense at least some of the mutual capacitances through the second plurality of traces, and (ii) to control the second drive-sense circuits to drive at least some of the second plurality of traces and to control the first drive-sense circuits to sense at least some of the mutual capacitances through the first plurality of traces, the method comprising driving the first plurality of electrically conductive traces through the first drive-sense circuits; sensing the mutual capacitances through the second, plurality of electrically conductive traces and the second drive-sense circuits; driving the second plurality of electrically conductive traces through the second drive-sense circuits; sensing the mutual capacitances through the first plurality of electrically conductive traces and the first drive-sense circuits, and detecting the locations of one or more touches on the touchscreen on the basis of sensed mutual capacitances exceeding predetermined voltage thresholds.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
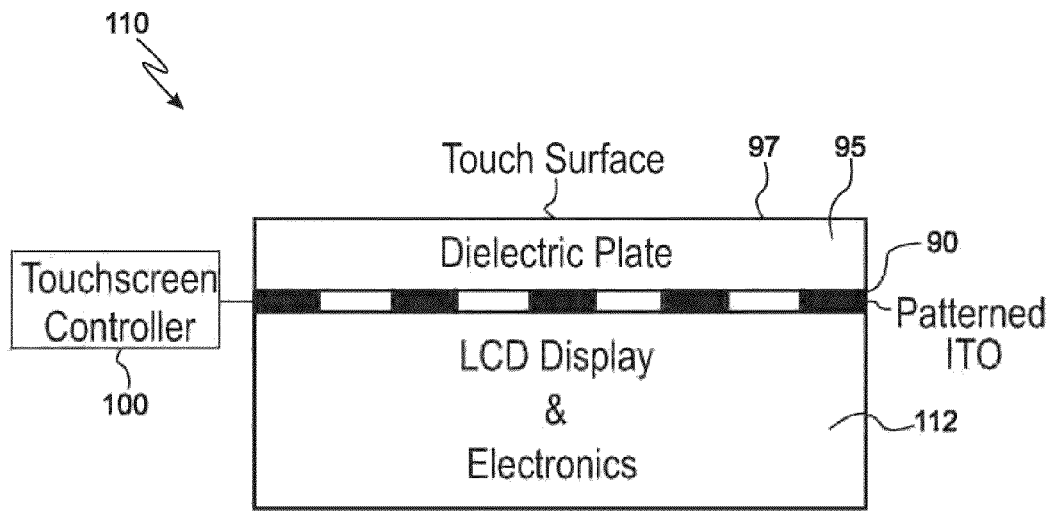
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath display 112.

Figure 2:
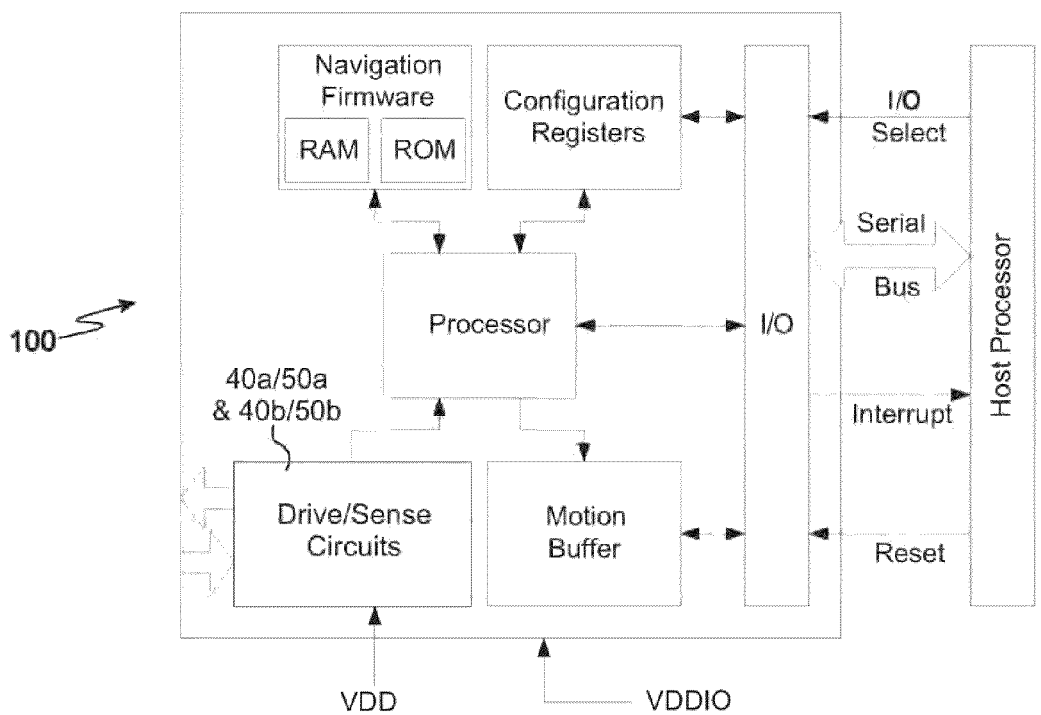
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
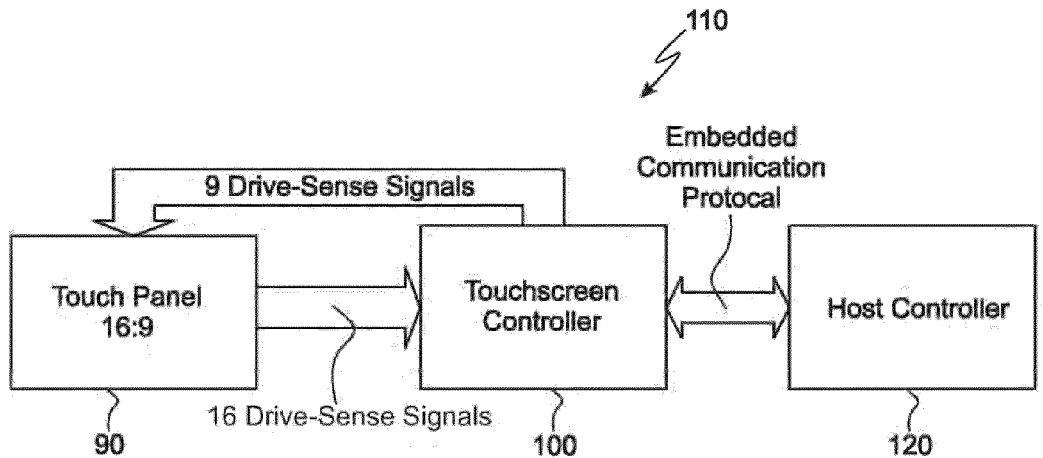
FIG. 3 shows one embodiment of a block diagram of a capacitive touchscreen system and a host controller.
Figure 4:
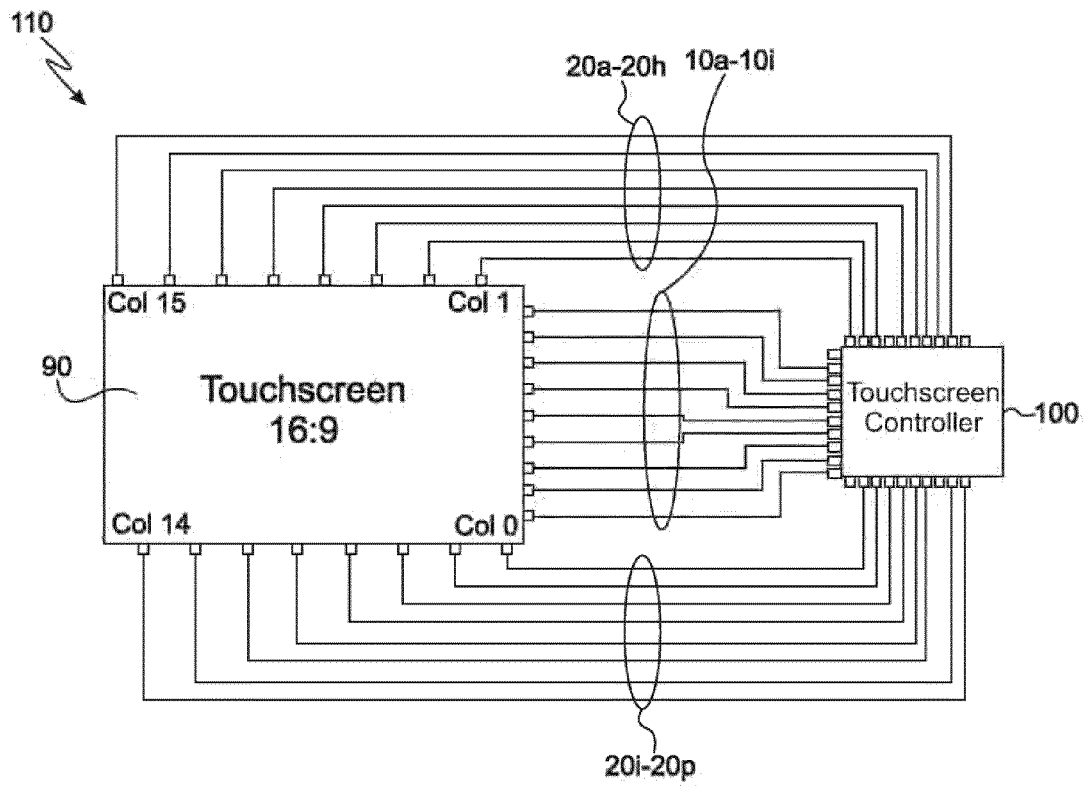
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 9 sense and drive signal lines and 16 drive and sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 features multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 automatically shifts to the next-lowest power consumption mode. However, as power consumption is reduced the response time to touches increases.

Figure 9:
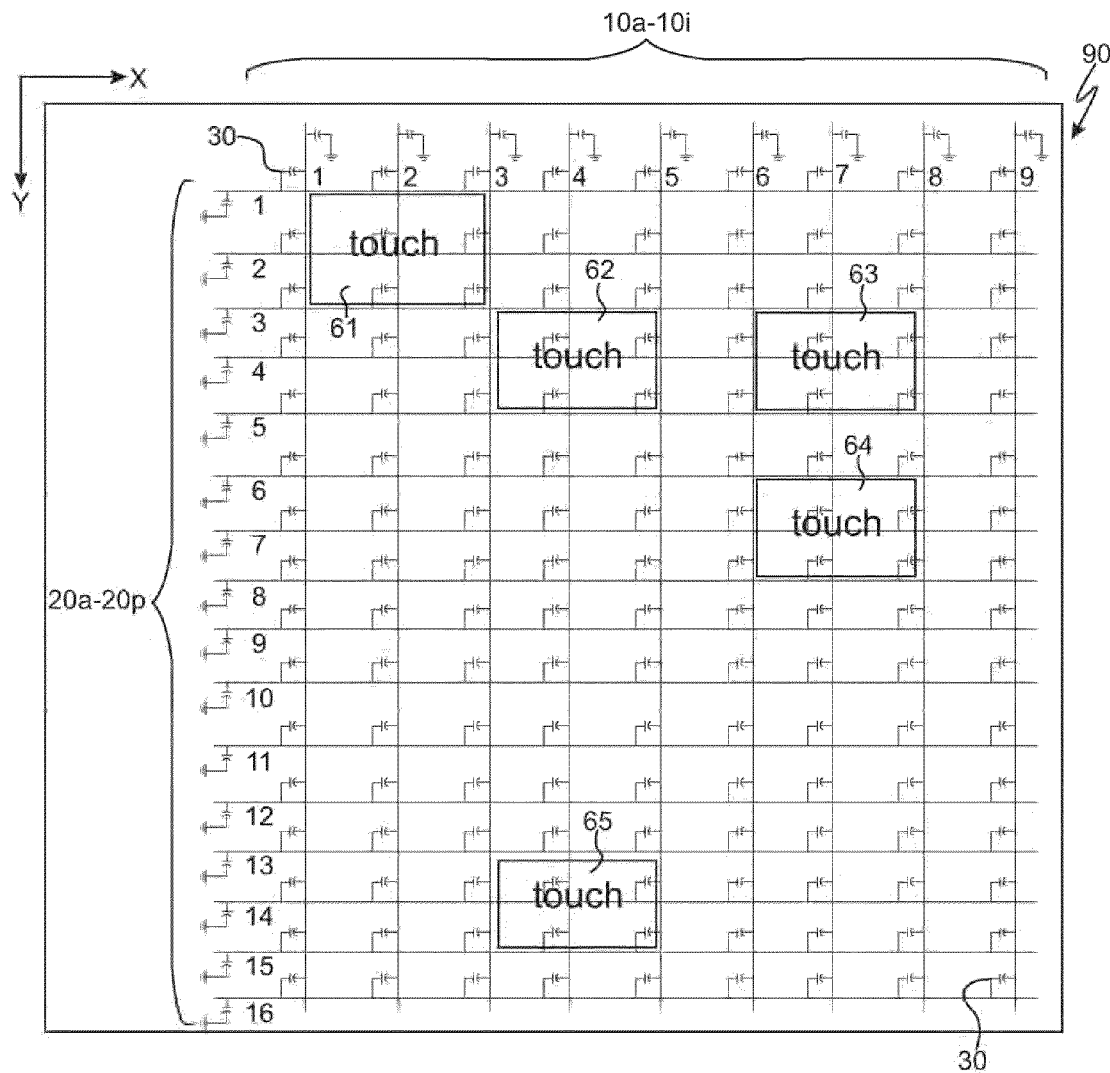
FIG. 9 shows one embodiment of a capacitive touchscreen.

According to one embodiment, and as shown in FIG. 9, an ITO grid on the touchscreen 90 comprises rows 20a-20p (or Y lines 1-16) and columns 10a-10i (or X lines 1-9), where rows 20a-20p are operably connected to second drive-sense circuits 40b/50b and Columns 10a-10i are operably connected to first sense-drive circuits 40a/50a. One configuration for routing ITO drive and sense lines to touchscreen controller 100 is shown in FIG. 4.

Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

Figure 5:
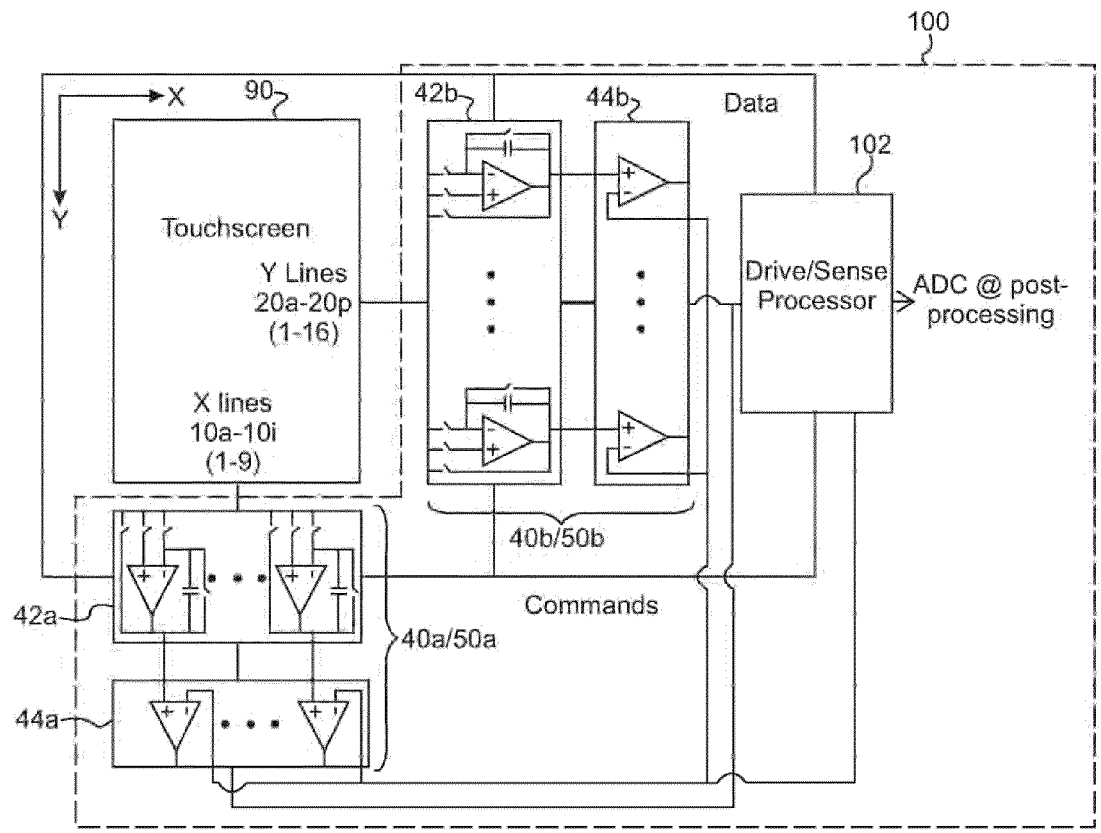
FIG. 5 shows a block diagram of one embodiment of a capacitive touchscreen system.

Referring now to FIG. 5, there is shown one embodiment of a capacitive touchscreen system 110 comprising touchscreen 90 and touchscreen controller 100. As shown, touchscreen controller 100 comprises drive/sense processor 102, first drive-sense circuits 40a/50a and second drive-sense circuits 40b/50b. Drive-sense circuits 40a/50a are operably connected to the first plurality of electrically conductive traces 10a-10i (lines 1-9 in FIG. 9) of touchscreen 90. Drive-sense circuits 40b/50b are operably connected to the second plurality of electrically conductive traces 20a-20p (lines 1-16 in FIG. 9) of touchscreen 90. As shown in FIGS. 4, 5 and 9, touchscreen 90 comprises a first plurality of electrically conductive traces 10a-10i (corresponding respectively to X lines 1-9) arranged in rows or columns, and a second plurality of electrically conductive traces 20a-20p (corresponding respectively to Y lines 1-16) arranged in rows or columns arranged at an angle with respect to the rows or columns of the first plurality of electrically conductive traces 10a-10i. Mutual capacitances 30 (see FIGS. 7 and 9) exist between the first and second pluralities of electrically conductive traces 10a-10i and 20a-20p at locations where the first and second pluralities of traces intersect, to such mutual capacitances 30 changing in the presence of one or more fingers brought into proximity thereto.

First drive-sense circuits 40a/50a are provided that are operably connected to the first plurality of electrically conductive traces 10a-10i. First drive-sense circuits 40a/50a comprise a bank of individual switching and amplifying circuits 42a, which in turn is followed by a bank of comparators 44a corresponding individually thereto. One each of first drive-sense circuits 40a/50a is operably connected to a corresponding one of the first plurality of electrically conductive traces or lines 10a-10i, each first drive-sense circuit comprising switching circuitry operably connectable to its corresponding trace on touchscreen 90 and to an amplifier and a capacitor connected to the output and negative input thereof (see 42a in FIG. 5), and to a comparator operable connected to the output of the amplifier (see 44a in FIG. 5).

Second drive-sense circuits 40b/50b are provided that are operably connected to the second plurality of electrically conductive traces 20a-20i. Second drive-sense circuits 40b/50b comprise a bank of individual switching and amplifying circuits 42b, which in turn is followed by a bank of individual comparators 44b. One each of second drive-sense circuits 40b/50b is operably connected to a corresponding one of the second plurality of traces 20a-20p, each second drive-sense circuit comprising switching circuitry operably connectable to its corresponding trace on touchscreen 90 and to an amplifier and a capacitor connected to the output and negative input thereof (See 42b in FIG. 5), and to a comparator operable connected to the output of the amplifier (see 44b in FIG. 5).

Figure 6:
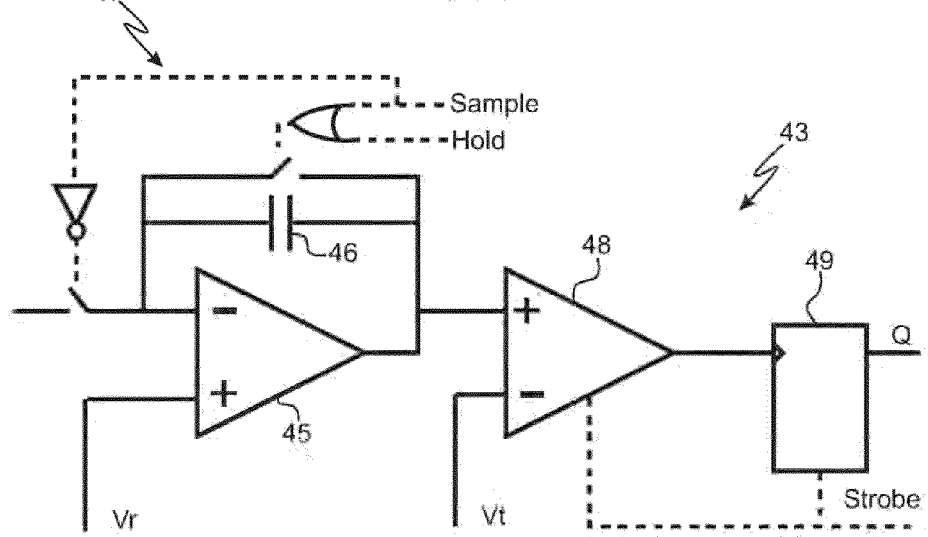
FIG. 6 shows one embodiment of a charge integrator circuit and corresponding comparator.

FIG. 6 shows one of many possible embodiments of one of the circuits of sense-drive circuits 40a/50a or 40b/50b of FIG. 5. As shown, circuit 43 comprises to operational amplifier 45 with feedback capacitor 46, sample-and-hold circuit 47, comparator 48, and flip-flap 49. Other embodiments of circuit 43 and of sense-drive circuits 40a/50a and 40b/50b are also contemplated that achieve the same or substantially the same functionality using suitable electrical and/or electronic components and circuitry, as will now be appreciated by those skilled in the art.

As further shown in FIG. 5, drive/sense processor 102, which preferably although not necessarily forms a portion of touchscreen controller 100 (which is preferably a chip, an integrated circuit or an ASIC), is operably connected to first and second drive-sense circuits 40a/50a and 40b/50b, respectively, and is configured: (a) to control the first drive-sense circuits 40a/50a to drive at least some of the first plurality of traces 10a-10i and to control the second drive-sense circuits 40b/50b to sense at least some of the mutual capacitances 30 through the second plurality of traces 20a-20p, and (b) to control the second drive-sense circuits 40b/50b to drive at least some of the second plurality of traces 20a-20p and to control the first drive-sense circuits 40a/50a to sense at least some of the mutual capacitances 30 through the first plurality of traces 10a-10i.

Figure 7:
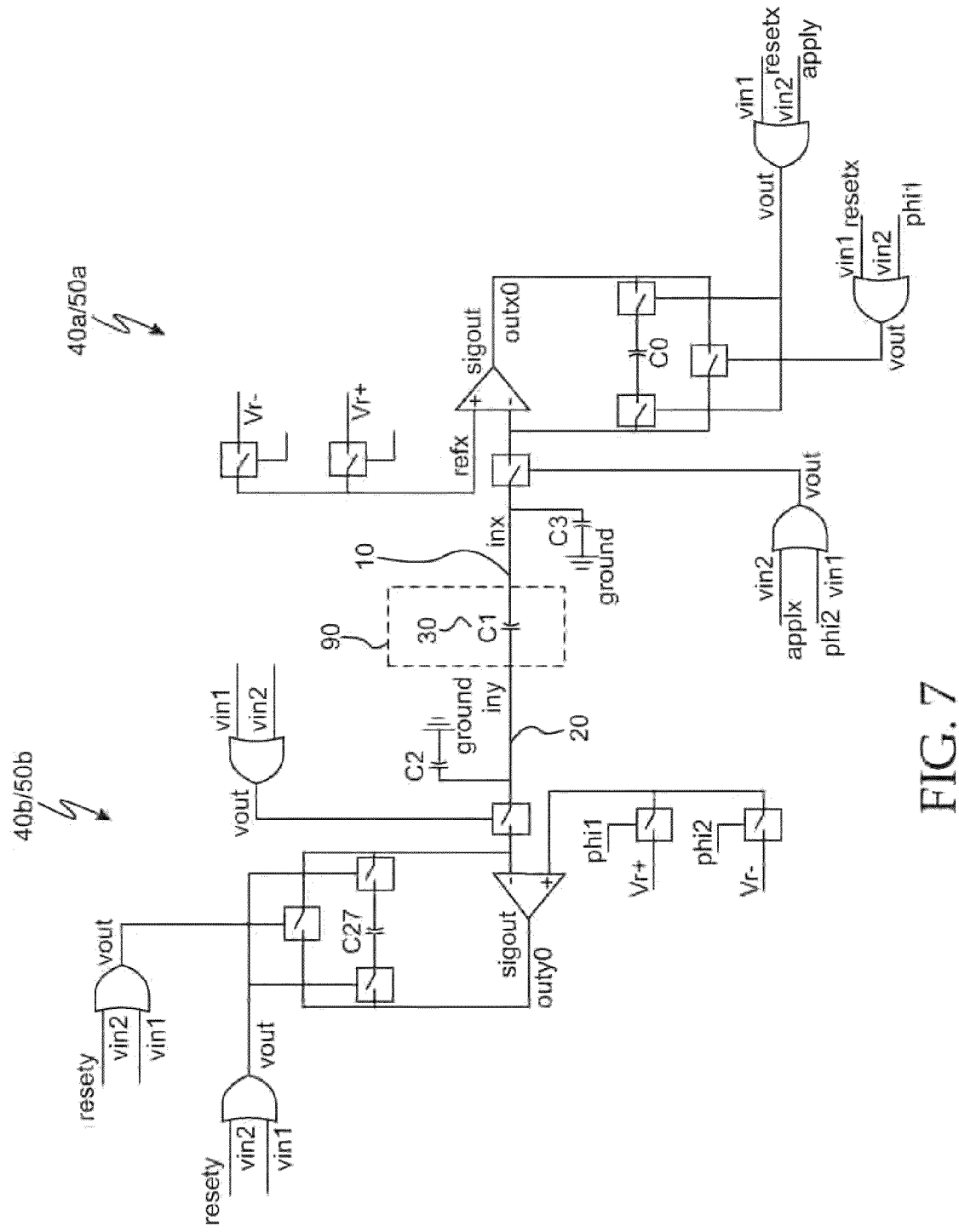
FIG. 7 shows one embodiment of single drive-sense circuits operably connected to one another through a mutual capacitance on a touchscreen.

FIGS. 5, 6 and 7 show further that first and second drive-sense circuits 40a/50a and 40b/50b may comprise circuit 43 (for the individual sense-drive circuits disposed within circuits 40a/50a and 40b/50b), capacitors in the first and second drive-sense circuits 40a/50a and 40b/50b may comprise sample-and-hold capacitor circuitry 46 and 47, and may further comprise logic circuitry configured to permit each of the first and second drive-sense circuits 40a/50a and 40b/50b to operate selectably and interchangeably under the control of drive/sense processor 102 as drive circuits or as sense circuits. Note that drive/sense processor 102, may be configured to control the first or second drive-sense circuits 40a/50a and 40b/50b such that the traces of the first or second pluralities of traces 10a-10i or 20a-20p may be driven substantially simultaneously, and such that the traces of the first or second pluralities of traces 10a-10i and 20a-20p may be sensed substantially simultaneously. Note further that the amplifiers in the individual drive-sense circuits may be configured to operate as followers with no capacitance disposed in the feedback loops thereof when the drive sense circuits are configured as driver circuits. Such follower configurations for the drive-sense circuits may be effected through the use of suitable switching and logic circuitry.

Referring now to FIGS. 5 and 6, each of the comparators in comparator banks 44a and 44b in the first and second pluralities of drive-sense circuits 40a/50a and 40b/50b it configured to detect a voltage associated with its corresponding mutual capacitance 30 at a predetermined threshold voltage $V_t$. At least some of the comparators in comparator banks 44a and 44b in the first and second pluralities of drive-sense circuits 40a/50a and 40b/50b may also be configured to detect voltages associated with their corresponding mutual capacitances 30 at predetermined high and low voltage thresholds. Moreover, drive/sense processor 102 may further be configured to control the first and second drive-sense circuits 40a/50a and 40b/50b to sense substantially simultaneously multiple mutual capacitances on touchscreen 90, or to detect the locations of multiple simultaneous or near-simultaneous touches on touchscreen 90, more about which is said below. The detection of locations of multiple simultaneous or near-simultaneous touches on touchscreen 90 may be accomplished using banks of comparators 44a and 44b to detect voltages associated with the mutual capacitances 30 corresponding thereto, more about which is said below. Drive/sense processor 102 may further be configured to control driving selected ones of the first and second pluralities of traces 10a-10i and 20a-20p on the basis of the locations of touches that have already been detected, and/or to control sensing selected ones of the mutual capacitances 30 on the basis of the locations of touches that have already been detected, more about which is said below. Drive/sense processor 102 may also be configured to: generate tags associated with the locations of detected touches, and/or to generate tags associated with the magnitudes of detected touches, more about which is also said below. Please note the first drive-sense circuits 40a/50a can be regarded as comprising at least one first drive-sense module. Each of the first drive-sense module comprises an operation amplifier and a comparator as shown in FIG. 6. Also, the second drive-sense circuits 40b/50b can be regarded as comprising at least one second drive-sense module. Each of the second drive-sense module comprises an operation amplifier and a comparator as shown in FIG. 6.

In one embodiment, the angle between the first and second pluralities of traces 10a-10i and 20a-20p is about 90 degrees, but may be any suitable angle such as, by way of example, about 15 degrees, about 30 degrees, about 45 degrees, about 60 degrees, or about 75 degrees. The first and second pluralities of electrically conductive traces 10a-10i and 20a-20p may be disposed in substantially parallel but vertically-offset first and second planes, respectively, or may be disposed in substantially the same plane. In one embodiment, the first and second pluralities of electrically conductive traces 10a-10i and 20a-20p comprise indium tin oxide ("ITO"), or any other suitable electrically conductive material. A liquid crystal display may be disposed beneath the first and second pluralities of electrically conductive traces 10a-10i and 20a-20p, or any other suitable image display. The first and second pluralities of electrically conductive traces 10a-10i and 20a-20p are preferably disposed on a substrate comprising an electrically insulative material that is substantially optically transparent.

Note that touchscreen system 110 may be incorporated into or form a portion of an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device, a household appliance, or any other suitable electronic device.

In another embodiment, there is provided a method of detecting touches on the foregoing capacitive touchscreen system comprising: (a) driving the first plurality of electrically conductive traces 10a-10i through the first drive-sense circuits 40a/50a; (b) sensing the mutual capacitances 30 through the second plurality of electrically conductive traces 20a-20p and the second drive-sense circuits 40b/50b; (c) driving the second plurality of electrically conductive traces 20a-20p through the second drive-sense circuits 40b/50b; (d) sensing the mutual capacitances 30 through the first plurality of electrically conductive traces 10a-10i and the first drive-sense circuits 40a/50a, and (e) detecting the locations of one or more touches on the touchscreen 90 on the basis of sensed mutual capacitances 30 exceeding predetermined voltage thresholds.

Such a method may further comprise driving substantially simultaneously the first plurality of electrically conductive traces 10a-10i through the first drive-sense circuits 40a/50a, driving substantially simultaneously the second plurality of electrically conductive traces 20a-20p through the second drive-sense circuits 40b/50b, sensing substantially simultaneously at least some of the mutual capacitances 30 through the first drive-sense circuits 40a/50a, and/or sensing substantially simultaneously at least some of the mutual capacitances 30 through the second drive-sense circuits 40b/50b. Note that sensing may comprise detecting voltages associated with mutual capacitances 30.

In one embodiment, a method may also comprise detecting the locations of multiple simultaneous or near-simultaneous touches on the touchscreen 90 through banks of comparators 44a and/or 44b, detecting voltages associated with the mutual capacitances 30 corresponding thereto, driving selected ones of the first and second drive-sense circuits 40b/50b and 40a/50a on the basis of the locations of touches that have already been detected, sensing selected ones of the first and second drive-tense circuits 40b/50b and 40a/50a on the basis of locations of touches that have already been detected, generating tags associated with the locations of detected touches, and generating tags associated with the magnitudes of detected touches.

Figure 8:
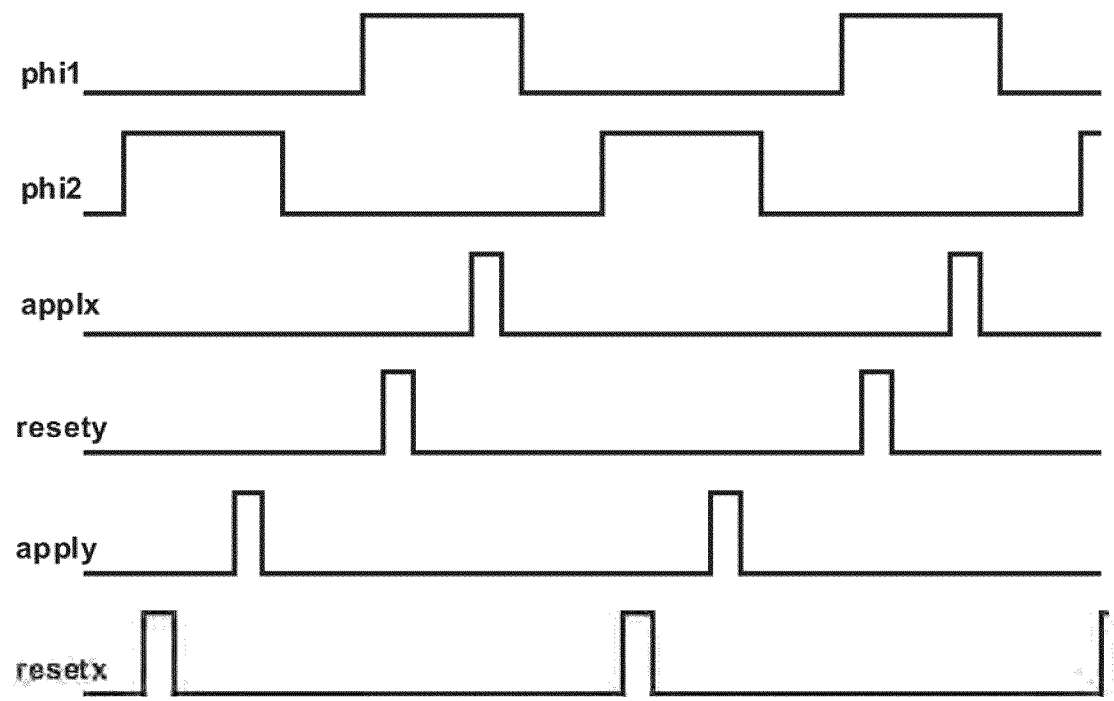
FIG. 8 shows command logic signals corresponding to portions of the circuits shown in FIG. 7.

Referring, now to FIG. 7, there is shown one embodiment of individual elements of first and second drive-sense circuits 40a/50a and 4ba/50b. As illustrated, the two drive-sense circuits 40a/50a and 40b/50b are connected through a single mutual capacitance 30 using selected ones of the first and second pluralities of electrically conductive traces 10a-10i (X lines 1-9) and 20a-20p (Y lines 1-16) disposed along the X and Y axes (see FIG. 9). As a result, mutual capacitance 30 in FIG. 7 is representative of a single a cross-coupled capacitor located at the single intersection of selected ones of the first and second pluralities of electrically conductive traces 10 and 20, where the magnitude of mutual capacitance 30 depends on the presence or non-presence of a finger in proximity thereto on touchscreen 90. One of the individual drive-sense circuits of drive-sense circuits 40a/50a or 40b/50b of FIG. 7 is selected to drive a selected line from among traces 10a-10i or 20a-20p, while the other individual drive sense circuit 40a/50a or 40b/50b of FIG. 7 is selected to sense a selected line from among traces 10a-10i or 20a-20p through mutual capacitance 30. Each of individual drive-sense circuits 40a/50a or 40b/50b shown in FIG. 7 is a charge integrator circuit with sample and hold capacitors, which may be disconnected or left floating with the collected charge, and which may be used for further processing. The outputs and inverting inputs of each of the amplifiers used in the charge integrator circuits are stored when the amplifier is used as the touchscreen line or trace driver. The virtual ground of each charge integrator circuit may be connected to low, and high drive potentials for both sensing and driving modes of operation. In one embodiment, the simple logic circuitry shown in FIG. 7 is employed to configure each of individual circuits 40a/50a and 40b/50b to operate interchangeably and selectably in sensing, storage, and driving modes. After being charged as a negative feedback element, the capacitor in each of drive-sense circuits 40a/50a or 40b/50b may be disconnected for storage of the collected charge when the corresponding amplifier is switched into driving mode. One embodiment of a command sequence for the logic control which permits the sensing and driving of signals for the circuits shown in FIG. 7 is shown in FIG. 8. When the logical signal high state is presented at a given switch drive, the switch corresponding thereto is closed.

Referring now to FIG. 9, there is shown one embodiment of a 9×16 touchscreen 90 comprising a first plurality of electrically conductive traces 10a through 10i (X lines 1-9) and a second plurality of electrically conductive traces 20a through 20p (Y lines 1-16). In one embodiment, mutual capacitances 30 (or drive-to-sense capacitors) for each pixel on touchscreen 90 each have a capacitance of about 1 pF when no finger touches are made on touchscreen 90. In the presence of finger touches on touchscreen 90, such mutual capacitances change to about 0.7 pF. In FIG. 9, each finger touch on touchscreen 90 causes a change of the mutual capacitances 30 disposed within a 2×2 pixel cluster.

In one embodiment, sensing, driving and preprocessing of signals provided to by and from touchscreen 90 follow the drive and sense protocol discussed below. The processing of signals provided by touchscreen 90 resulting from the provision of driving signals thereto, and the sensing of signals resulting from the presence of one or more finger placed in proximity thereto, is described with reference to the block diagram shown in FIG. 5.

In one embodiment, driving of touchscreen 90 starts with sense-drive circuits 40a/50a driving all of X lines 1-9 (the first plurality of electrically conductive traces, 10a-10i) while electric charge is acquired in the charge integrator circuits of sense-drive circuits 40b/50b operably connected to the Y lines 1-16 (the second plurality of electrically conductive traces, 20a-20p), followed by the storage of the Y line signals into the hold capacitors of sense-drive circuits 40b/50b. Note that the integration capacitors described above may be used for signal storage. During driving, drive-sense circuits 40a/50a are operably connected to X lines 1-9 in configured in a buffer mode while sense-drive circuits 40b/50b are operably connected to the Y lines configured in an integrator mode. The virtual grounds of sense-drive circuits 40a/40b and 40b/50b operably connected to the X and Y lines, respectively, are connected to corresponding low and high levels of drive potential. The sense command sequence is similar to the one described for the circuits described above in connection with FIGS. 7 and 8.

Charge data corresponding to the Y line signals acquired in the capacitors of sense-drive circuit 40b/50b are then presented as electric potentials to the comparators of comparator bank 44b, where signals exceeding a predetermined threshold $V_t$ are detected. As described above, FIG. 6 shows one embodiment of a single sense-drive circuit configured to sense such signals and present them to comparator 48 corresponding thereto. While presenting data for the detected Y line signals to the comparators, the acquisition or sensing of X line signals may begin by configuring sense-drive circuits 40b/50b operably connected to the Y lines for operation in the drive mode, and applying the drive signals to all the Y lines while acquiring charge into sense-drive circuits 40a/50a configured as charge integrator circuits operably connected to the X lines.

Figure 10:
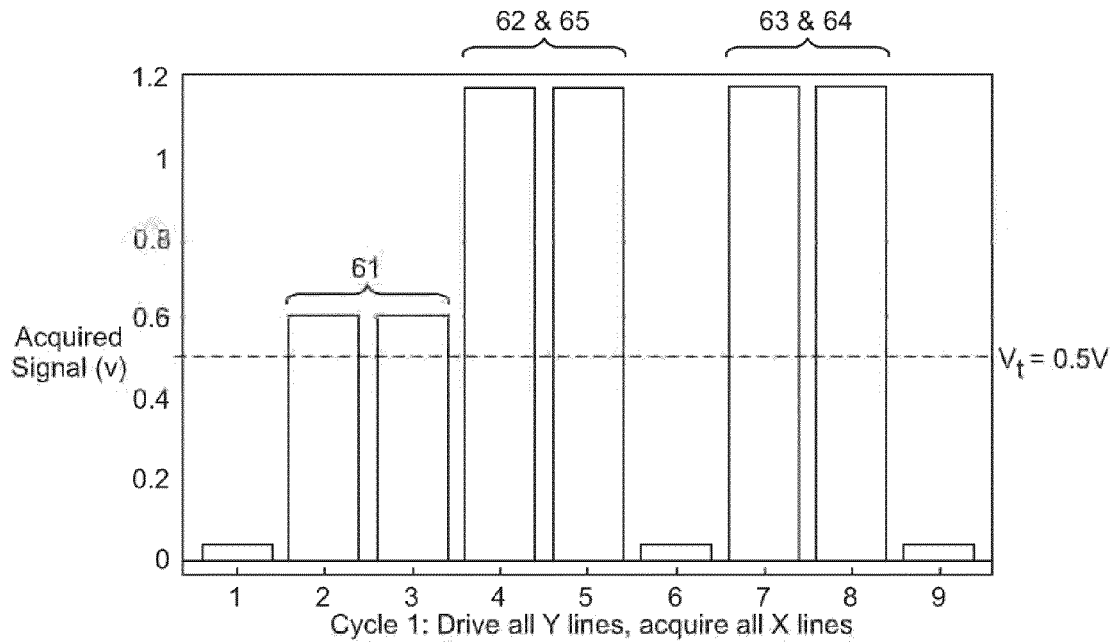
FIGS. 10 through 19 show histograms corresponding to signals sensed along X or Y lines of the touchscreen of FIG. 9.

To detect the positions of multiple simultaneous or near-simultaneous finger touches 61, 62, 63, 64 and 65 made on touchscreen 90 of FIG. 9, ten simulated successive sensing and driving cycles performed along the X and Y axes of touchscreen 90 in FIG. 9 are illustrated as histograms in FIGS. 10 though 19, which correspond, respectively, to cycles 1 through 10. As will be seen by referring to the histograms, overlapping and non-overlapping, touches sensed along the X and Y axes correspond to multiple sensed touches and are clearly visible as such.

When referring to FIG. 9 and the histograms of sensed touch signals shown in FIGS. 10 through 19, it will be seen that two touches for X axis sensed signals overlap along the same X lines (see touches 62 and 65 disposed along X lines 4 and 5), and that and one touch for Y axis sensed signals overlap along the same Y line (see touches 62 and 63 disposed along Y lines 3 and 4). The touch region for each touch occupies an area of two pixels by two pixels. Further processing was based on selection criteria which characterized the sensing process as two neighboring touch signals exceeding a predetermined threshold Vt. More advanced processing criteria may also be used to select signal processing regions of interest using sensed signals which exceed different voltage thresholds, such as a window comparison (higher than the low threshold $V_{tL}$ and lower than the high threshold $V_{tH}$). To disentangle clearly non-overlapping touches using signals sensed along the X and Y axes, different or modified selection criteria can be used. A relatively simple touch sensing method or algorithm is described in detail below, however.

As mentioned above, the touch sensing method or algorithm described below is based on a selection of regions of interest that have an area of 2 pixels by 2 pixels, where neighboring sensed signals exceed a predetermined signal threshold $V_t$. In the touch sensing examples discussed in further detail herein, $V_t$ was selected to be 0.5 V. Note that different combinations of different sensed readout lines, in combination with the processing of sensed signals, may be used to separate multiple finger touches that occur in close proximity to one another.

As shown in FIG. 9, multiple simultaneous or near-simultaneous touches 61 through 65 are located at different coordinates or locations on touchscreen 90. Touch 61 is located at pixel or touchscreen location X(2,3), Y(2,3). Touch 62 is located at pixel or touchscreen location X(4,5), Y(4,5). Touch 63 is located at pixel or touchscreen location X(7,8), Y(4,5). Touch 64 is located at pixel or touchscreen location X(7,8), Y(7,8). Touch 65 is located at pixel or touchscreen location X(4,5), Y(14,15).

FIG. 10 represents the results of simultaneously driving all Y lines and simultaneously sensing all X lines during cycle 1. As shown in FIG. 10, touches 61, 62 and 65, and 63 and 64 are detected by first sense-drive circuits 40a/50a, as such touches cause signals to be sensed by first drive-sense circuits 40a/50a that exceed a threshold of 0.5 volts (or $V_t$). As further shown in FIG. 10, touch 61 is the only touch disposed along X lines 2 and 3, and therefore causes lower-amplitude signals to be detected on X lines 2 and 3 than the higher-amplitude signals detected on X lines 4 and 5 (which correspond to multiple touches 62 and 65 being disposed along X lines 4 and 5), and 7 and 8 (which correspond to multiple touches 63 and 64 being disposed along X lines 7 and 8). Determining which of touches 61, 62, 63, 64 and 65 corresponds to unique X,Y locations on touchscreen 90 is not possible after having completed only cycle 1.

Figure 11:
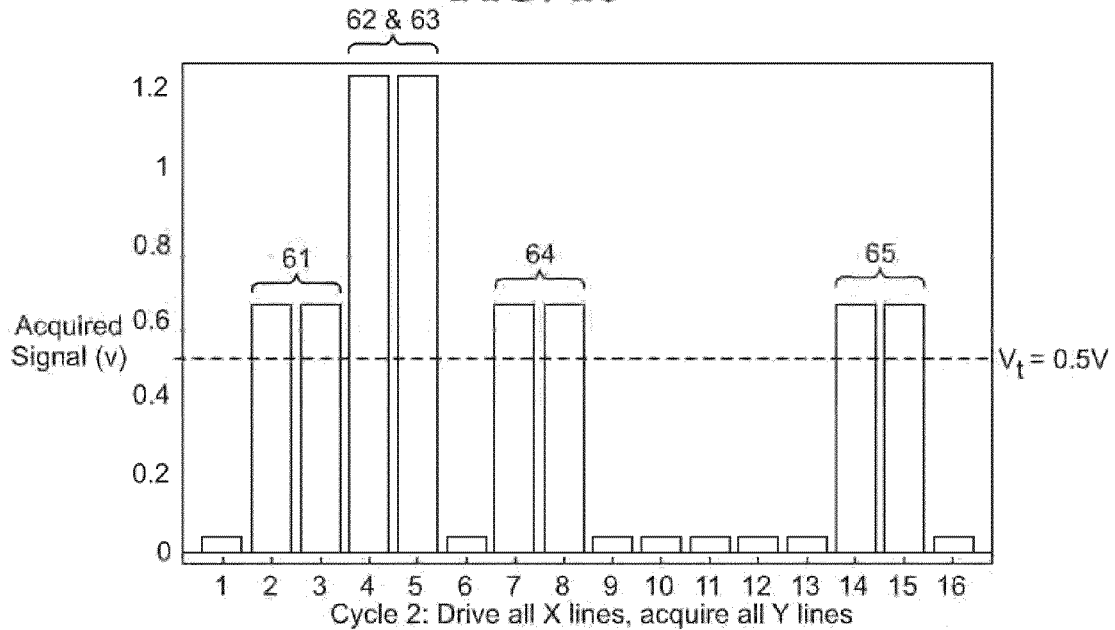

FIG. 11 represents the results of simultaneously driving all X lines and simultaneously sensing all Y lines during cycle 2. As shown in FIG. 11, touches 61, 62 and 63, and 63 and 65 are detected by second sense drive circuits 40b/50b, as such touches cause signals to be sensed by second drive-sense circuits 40b/50b that exceed a threshold of 0.5 volts (or $V_t$). As further shown in FIG. 11, touches 61, 64 and 65 cause lower-amplitude signals to be detected on Y lines 2 and 3, 7 and 8, and 14 and 15, respectively than the higher-amplitude signals detected on Y lines 4 and 5 (which correspond to multiple touches 62 and 63 being disposed along Y lines 4 and 5). Determining which of touches 61, 62, 63, 64 and 65 corresponds to which X,Y locations on touchscreen 90 is still not possible after having completed only cycles 1 and 2. But the information obtained during cycles 1 and 2 that has been presented to drive/sense processor 102 is employed by drive/sense processor 102 to determine which from among selected X and Y lines should next be driven and sensed during cycle 3 so that the process of determining the precise and unique (X,Y) locations for each of the individual touches can begin.

Figure 12:
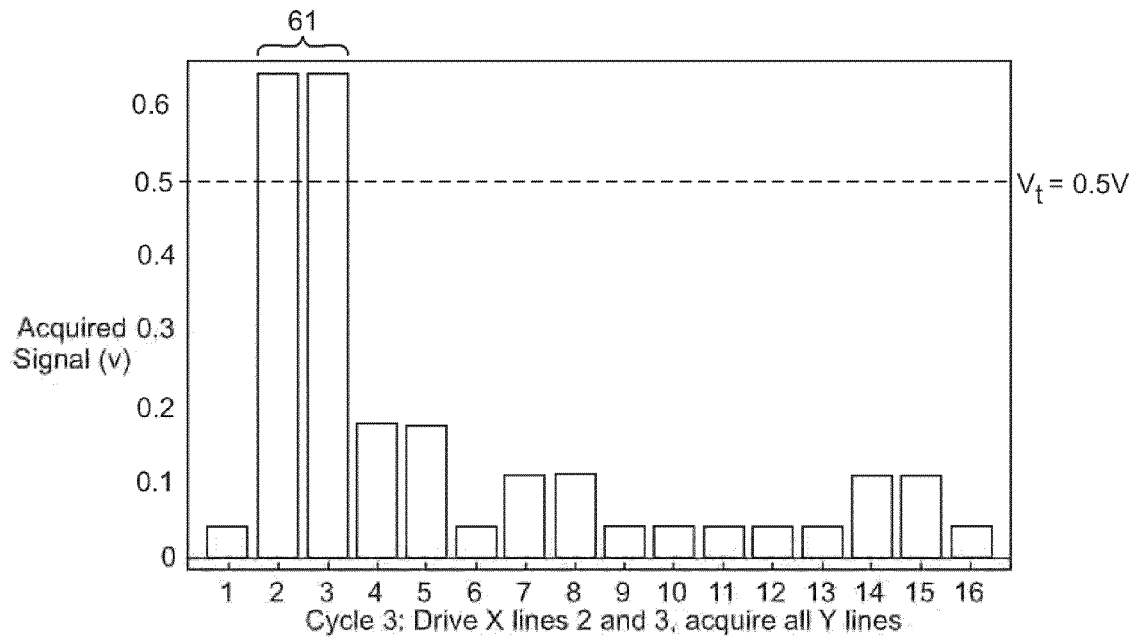

Referring now to FIG. 12, there are shown the results obtained by driving only X lines 2 and 3 (which lines have been selected to be driven by drive/sense processor 102 on the basis of the sensed signals and their corresponding locations determined in cycles 1 and 2), and sensing all the Y lines. As a result, touch 61 is determined during cycle 3 to occur at Y location Y(2,3), and corresponds to the only sensed signal exceeding the threshold voltage $V_t$.

Figure 13:
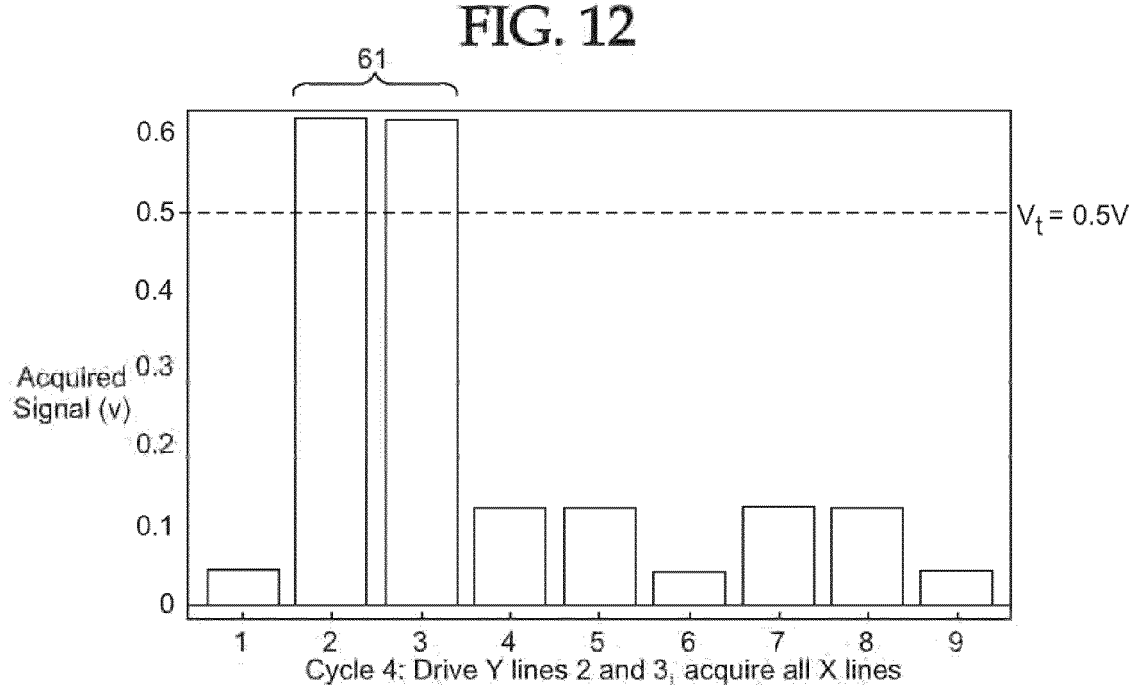

Cycle 4 of FIG. 13 follows cycle 3. FIG. 13 shows the results obtained by driving only Y lines 2 and 3 (which lines have been selected to be driven by drive/sense processor 102 on the basis of the sensed signals and their corresponding locations determined in cycles 1, 2 and 3), and sensing all the X lines. As a result, touch 61 is determined during cycle 4 to occur at X location X(2,3), and corresponds to the only sensed signal exceeding the threshold voltage $V_t$. Now the cluster X,Y coordinates of touch 61 have been determined by sense/drive processor 102, and data corresponding to such cluster coordinates are multiplexed for parallel digitization and further processing from drive/sense processor 102 to touchscreen controller 100.

Figure 14:
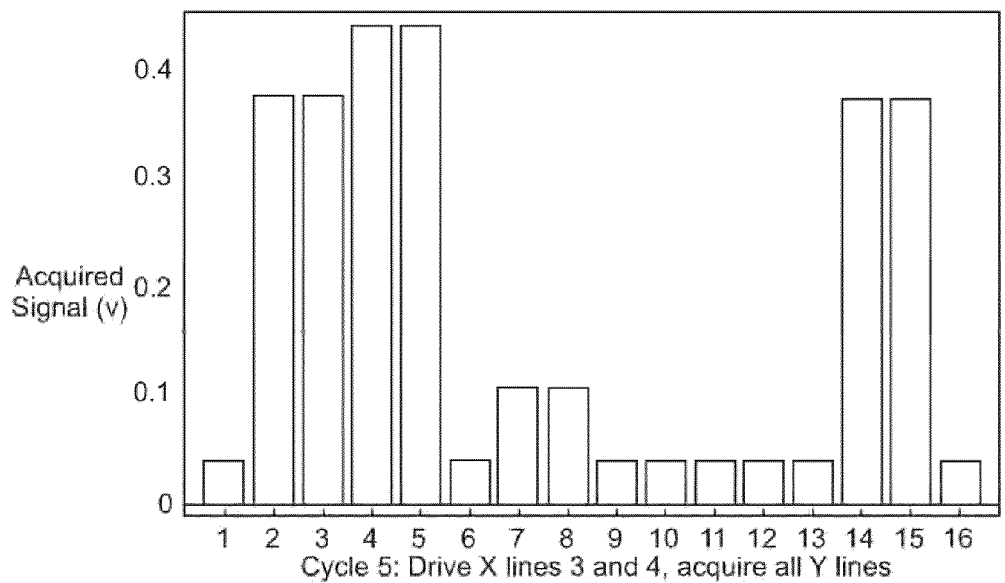

Drive/sense processor 102 again analyzes the sensed data that have been presented to it by sense-drive circuits 40a/50a and 40b/50b during preceding cycles, and in cycle 5 proceeds to instruct sense-drive circuits 40a/50a to drive X lines 3 and 4, and sense-drive circuits 40b/50b to sense all Y lines. The results of this particular sequence of driving and sensing commands are shown in FIG. 14, where it will be seen that none of the signals sensed by sense-drive circuits 40b/50b trigger the detection of any voltages along any Y lines that equal or exceed the threshold voltage $V_t$. As a result, no data corresponding to any detected cluster coordinates are transferred from drive/sense processor 102 to touchscreen controller 100 during cycle 5.

Figure 15:
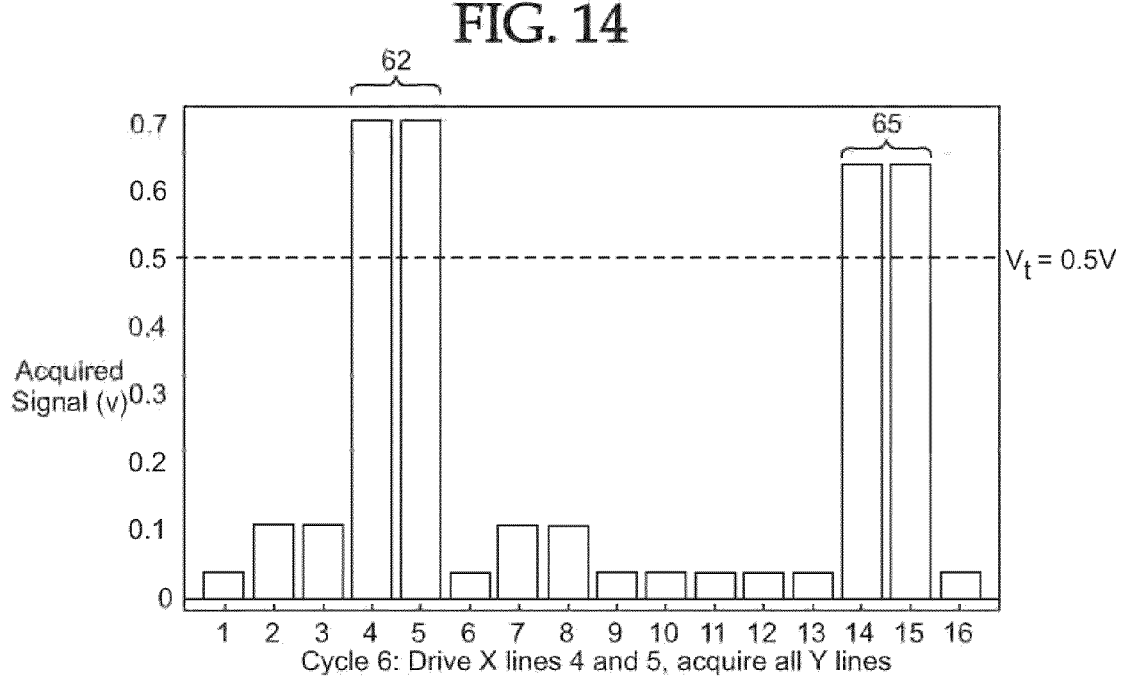

Drive/sense processor 102 again analyzes the sensed data that have been presented to it by sense-drive circuits 40a/50a and 40b/50b during preceding cycles 1 through 5, and in cycle 6 drive/sense processor 102 instructs sense-drive circuits 40a/50a to drive X lines 4 and 5, and sense-drive circuits 40b/50b to sense all Y lines. The results of this particular sequence of driving and sensing to commands are shown in FIG. 15, where it will be seen that threshold voltages are detected along Y lines 4 and 5, and along Y lines 14 and 15, which correspond, respectively, to single touch 62 being disposed along Y lines 4 and 5, and single touch 65 being disposed along Y lines 14 and 15.

Figure 16:
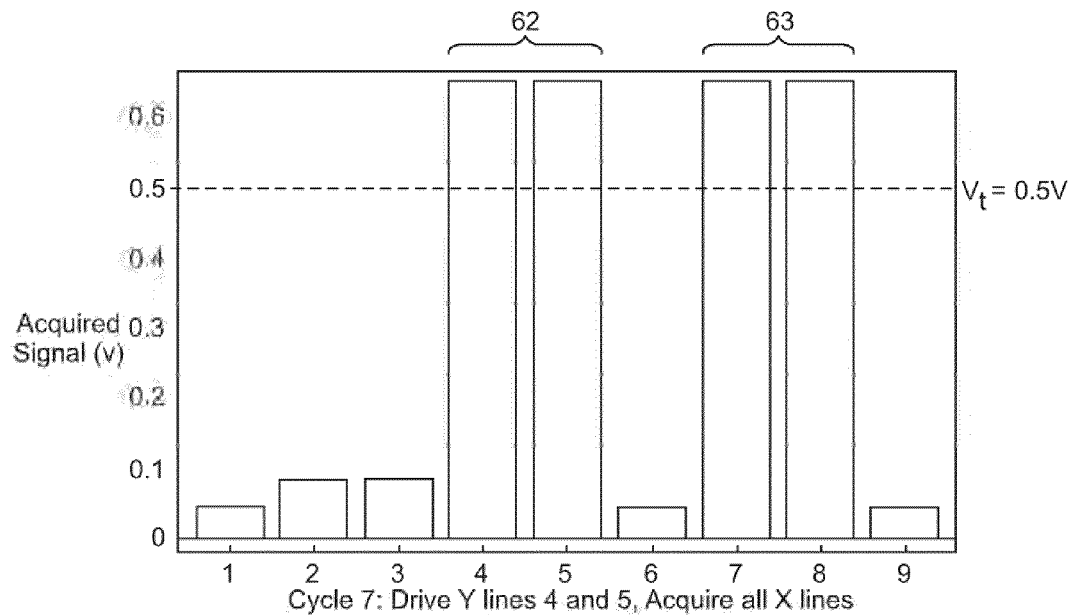

The result of cycle 6 is that a further region of interest for subsequent driving and sensing signals is identified by drive/sense processor 102, which during cycle 7 instructs sense-drive circuits 40b/50b to drive Y lines 4 and 5, and sense-drive circuits 40a/50a to sense all X lines. The results of instructions, driving and sensing for cycle 7 are shown in FIG. 16, where touches 62 and 63 are detected at X coordinates X(4,5) and X(7,8), respectively, owing to threshold voltages $V_t$ being detected along X lines 4 and 5, and 7 and 8. Insufficient information is provided during cycle 7, however, to permit the unique and precise X,Y locations of touches 62 and 63 to be determined by sense/drive processor 102.

Figure 17:
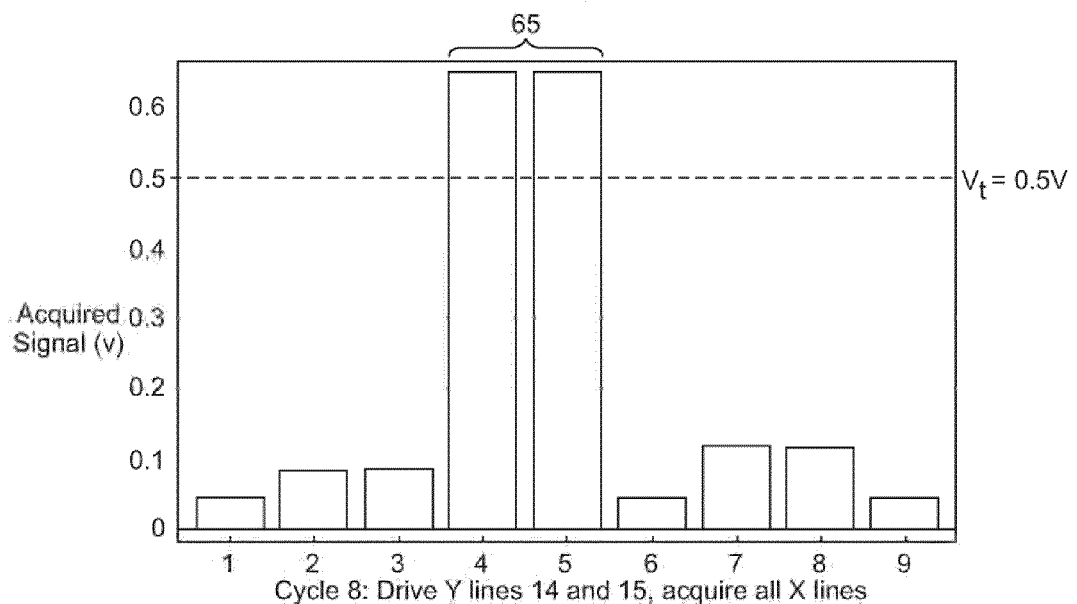

Accordingly, during cycle 8 drive/sense processor 102 instructs sense-drive circuits 40b/50b to drive Y lines 14 and 15, and sense-drive circuits 40a/50a to sense all X lines. The results of this particular sequence of driving and sensing commands are shown in FIG. 17, where it will be seen that threshold voltages are detected along X lines 4 and 5 only, which corresponds to touch 65 disposed along X lines 4 and 5 and Y lines 14 and 15. Thus, the unique and precise location of touch 65 is determined by drive/sense processor 102 during cycle 8. Because of information obtained during cycles 1 through 8, the unique and precise location of touch 62 is also determined by drive/sense processor 102 during cycle 8. Data corresponding to the cluster X,Y coordinates of touches, 62 and 65 determined by sense/drive processor 102 during cycle 8 are multiplexed for parallel digitization and further processing from drive/sense processor 102 to touchscreen controller 100.

Figure 18:
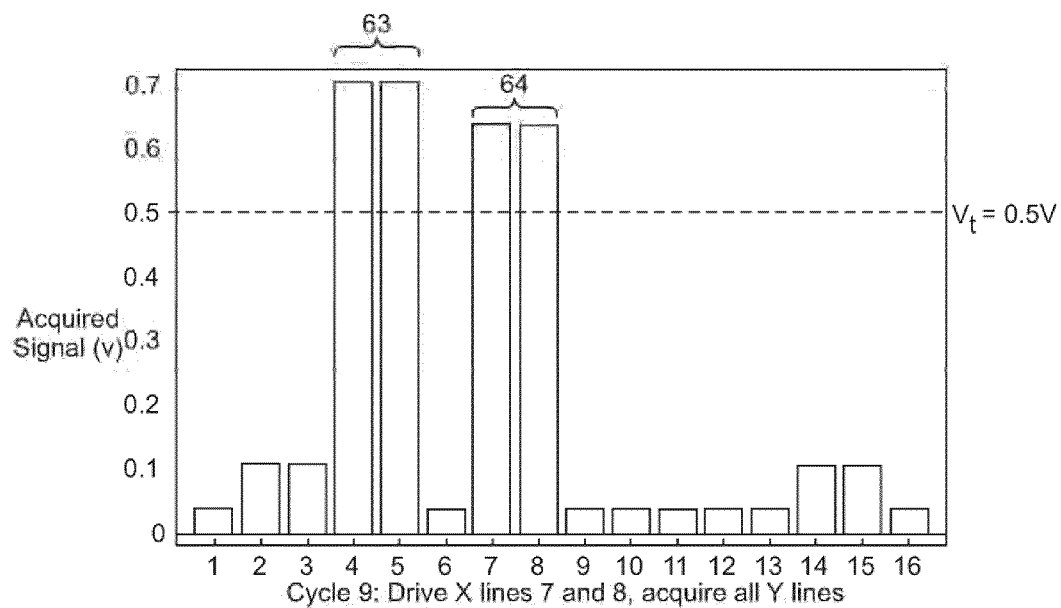

Drive/sense processor 102 again analyzes the sensed data that have been presented to it by sense-drive circuits 40a/50a and 40b/50b during preceding cycles 1 through 8, and in cycle 9 drive/sense processor 102 instructs sense-drive circuits 40a/50a to drive X lines 7 and 8, and sense-drive circuits 40b/50b to sense all Y lines. The results of this particular sequence of driving and sensing commands are shown in FIG. 18, where it will be seen that threshold voltages are detected along Y lines 4 and 5, and along Y lines 7 and 8, which correspond, respectively, to single touch 63 disposed along Y lines 4 and 5, and single touch 64 disposed along Y lines 7 and 8. Insufficient information is provided during cycle 9, however, to permit the unique and precise X,Y locations of touches 63 and 64 to be determined by sense/drive processor 102.

Figure 19:
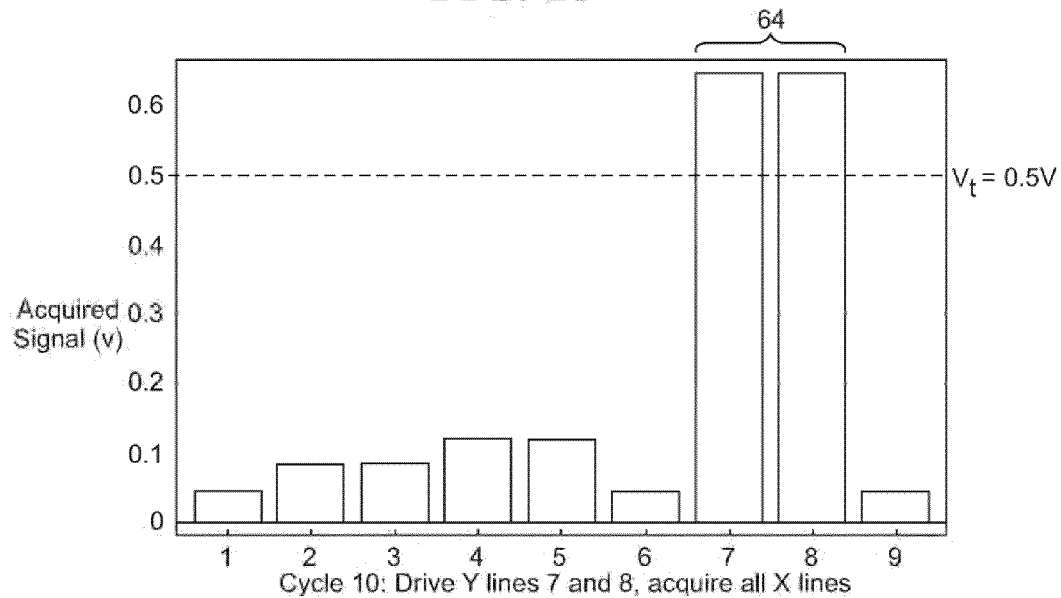

Accordingly, during cycle 10 drive/sense processor 102 instructs sense-drive circuits 40b/50b to drive Y lines 7 and 8, and sense-drive circuits 40a/50a to sense all X lines. The results of this particular sequence of driving and sensing commands are shown in FIG. 19, where it will be seen that threshold voltages are detected along X lines 7 and 8 only, which corresponds to touch 64 disposed along X lines 7 and 8 and Y lines 7 and 8. Thus, the unique and precise location of touch 64 is determined by drive/sense processor 102 during cycle 10. Because of information obtained during cycles 1 through 9, the unique and precise location of touch 63 is also determined by drive/sense processor 102 during cycle 10. Data corresponding to the cluster X,Y coordinates of touches 63 and 64 determined by sense/drive processor 102 during cycle 8 are multiplexed for parallel digitization and further processing from drive/sense processor 102 to touchscreen controller 100.

Note that the various teachings presented herein may be applied to optically transmissive or non-optically-transmissive touchpads disposed, for example, on a printed circuit board, a flex board or other suitable substrate. While the primary use of capacitive touchscreen 90 is believed likely to be in the context of relatively small portable devices, and touchpads or touchscreens therefore, it may alto be of value in the context of larger devices, including, for example, keyboards associated with desktop computers or other less portable devices such as exercise equipment, industrial control panels, household appliances, and the like. Similarly, while many embodiments of the invention are believed most likely to be configured for manipulation by a user's fingers, some embodiments may also be configured for manipulation by other mechanisms or body parts. For example, the invention might be located on or in the hand rest of a keyboard and engaged by the heel of the user's hand. Furthermore, various embodiments of capacitive touchscreen system 110 and capacitive touchscreen 90 are not limited in scope to drive electrodes disposed in rows and sense electrodes disposed in columns. Instead, rows and columns are interchangeable in respect of sense and drive electrodes. Various embodiments various embodiment of capacitive touchscreen system 110 and capacitive touchscreen 90 are also capable of operating in conjunction with a stylus, such that stylus touches on touchscreen 90 are detected. System 110 and touchscreen 90 may further be configured to permit the detection of both of finger touches and stylus touches.

Note further that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

I claim:

1. A capacitive touchscreen system, comprising:
a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or touch devices brought into proximity thereto;
first drive-sense circuits, one each of such first drive-sense circuits being operably connectable to a corresponding one of the first plurality of traces by switching circuitry, each first drive-sense circuit being operably connectable to its corresponding trace and to a first amplifier, a first capacitor being operably connected to a first negative input and a first output of the first amplifier, and to a first comparator operably connected to the first output of the first amplifier,
second drive-sense circuits, one each of such second drive-sense circuits being operably connectable to a corresponding one of the second plurality of traces by switching circuitry, each second drive-sense circuit being operably connectable to its corresponding trace and a second amplifier, a second capacitor being operably connected to a second negative input and a second output of the second amplifier, and to a second comparator operably connected to the second output of the second amplifier, and
a drive/sense processor operably connected to the first and second drive-sense circuits, respectively, and configured:
(a) to control the first plurality of first drive-sense circuits to drive at least some of the first plurality of traces; and to control the second plurality of second drive-sense circuits to sense at least one first voltage associated with at least some of the mutual capacitances through the second plurality of traces and to compare the first voltage with a predetermined voltage threshold, and
(b) to control the second drive-sense circuits to drive at least some of the second plurality of traces; and to control the first drive-sense circuits to sense at least one second voltage associated with at least some of the mutual capacitances through the first plurality of traces, and to compare the second voltage with the predetermined voltage threshold;
wherein the detection of locations of multiple simultaneous or near-simultaneous touches on the touchscreen is accomplished via the step (a) and the step (b) performed by the drive/sense processor.

2. The capacitive touchscreen system of claim 1, wherein the first and second drive-sense circuits comprise charge integrator circuits.

3. The capacitive touchscreen system of claim 1, wherein the capacitors in the first and second drive-sense circuits are sample-and-hold capacitors.

4. The capacitive touchscreen system of claim 1, wherein each of the first and Second drive-sense circuits comprises logic circuitry configured to permit each of the first and second drive-sense circuits to operate selectably as drive circuits or as sense circuits.

5. The capacitive touchscreen system of claim 1, wherein the drive/sense processor is configured to control the first or second drive-sense circuits such that the traces of the first or second pluralities of traces are driven substantially simultaneously.

6. The capacitive touchscreen system of claim 1, wherein the drive/sense processor is configured to control the first or second drive-sense circuits such that the traces of the first or second pluralities of traces are sensed substantially simultaneously.

7. The capacitive touchscreen system of claim 1, wherein each of the comparators in the first drive-sense circuits is configured to compare the second voltage with the predetermined voltage threshold, and each of the comparators in the second drive-sense circuits is configured to compare the first voltage with the predetermined voltage threshold.

8. The capacitive touchscreen system of claim 1, wherein each of the comparators in the first drive-sense circuits is configured to compare the second voltage with predetermined high and low voltage thresholds, and each of the comparators in the second drive-sense circuits is configured to compare the first voltage with the predetermined high and low voltage thresholds.

9. The capacitive touchscreen system of claim 1, wherein the drive/sense processor is further configured to control the first and second drive-sense circuits to sense substantially simultaneously multiple mutual capacitances on the touchscreen.

10. The capacitive touchscreen system of claim 1, wherein the drive/sense processor is further configured to control the first and second drive-sense circuits to detect the locations of multiple simultaneous or near-simultaneous touches on the touchscreen.

11. The capacitive touchscreen system of claim 1, wherein the drive/sense processor is further configured to control driving selected ones of the first and second pluralities of traces on the basis of the locations of touches that have already been detected.

12. The capacitive touchscreen system of claim 1, wherein the drive/sense processor is further configured to control sensing selected ones of the mutual capacitances on the basis of the locations of touches that have already been detected.

13. The capacitive touchscreen system of claim 1, wherein the drive/sense processor is further configured to generate tags associated with the locations of detected touches.

14. The capacitive touchscreen system of claim 1, wherein the drive/sense processor is further configured to generate tags associated with the magnitudes of detected touches.

15. The capacitive touchscreen system of claim 1, wherein the angle is about 90 degrees.

16. The capacitive touchscreen system of claim 1, wherein the first and second pluralities of electrically conductive traces are disposed in substantially parallel but vertically-offset first and second planes, respectively.

17. The capacitive touchscreen system of claim 1, wherein the first and second pluralities of electrically conductive traces are disposed in substantially the same plane.

18. The capactive touchscreen system of claim 1, wherein the first and second pluralities of electrically conductive traces comprise iridium tin oxide ("ITO").

19. The capacitive touchscreen system of claim 1, wherein the first and second pluralities of electrically conductive traces form a 9×16 sensor array, an 8×12 sensor array, or a 12×20 sensor array.

20. The capacitive touchscreen system of claim 1, wherein a liquid crystal display is disposed beneath the first and second pluralities of electrically conductive traces.

21. The capacitive touchscreen system of claim 20, wherein the substrate is substantially optically transparent.

22. The capacitive touchscreen system of claim 1, wherein an image display is disposed beneath the first and second pluralities of electrically conductive traces.

23. The capacitive touchscreen system of claim 1, wherein the first and second pluralities of electrically conductive traces are disposed on a substrate comprising an electrically insulative material.

24. They capacitive touchscreen system of claim 1, wherein the first and second drive-sense circuits are incorporated into an integrated circuit.

25. The capacitive touchscreen system of claim 1, wherein the touchscreen system is incorporated into or forms a portion of an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device a household appliance, and an electronic device.

26. The capacitive touchscreen system of claim 1, wherein the first drive-sense circuits comprises at least first drive-sense module respectively with a first signal path, wherein the second drive-sense circuits comprises at least second drive-sense module respectively with a second signal path;

wherein the first drive-sense module performs driving via a corresponding one of the first signal paths while the first drive-sense circuit performing driving;

wherein the first drive-sense module performs sensing via the corresponding one of the first signal paths while the first drive-sense circuit performing sensing;

wherein the second drive-sense module performs driving via a corresponding one of the second signal paths while the second drive-sense circuit performing driving;

wherein the second drive-sense module performs sensing via the corresponding one of the second signal paths while the second drive-sense circuit performing sensing.

27. A method of detecting touches on a capacitive touchscreen system comprising a touchscreen comprising a first plurality of electrically conductive traces arranged in rows or columns, and a second plurality of electrically conductive traces arranged in rows or columns arranged at an angle with respect to the rows or columns of the first plurality of electrodes, mutual capacitances existing between the first and second pluralities of traces at locations where the first and second pluralities of traces intersect, such mutual capacitances changing in the presence of one or more fingers or touch devices brought into proximity thereto, first drive-sense circuits, one each of such first drive-sense circuits being operably connectable to a corresponding one of the first plurality of traces by switching circuitry, each first drive-sense circuit being operably connectable to its corresponding trace and to a first amplifier, a first capacitor being operably connected to a first negative input and a first output of the first amplifier, and to a first comparator operably connected to the first output of the first amplifier, second drive-sense circuits, one each of such second drive-sense circuits being operably connectable to a corresponding one of the second plurality of traces by switching circuitry, each second drive-sense circuit being operably connectable to its corresponding trace and a second amplifier, a second capacitor being operably connected to a second negative input and a second output of the second amplifier, and to a second comparator operably connected to the second output of the second amplifier, and a drive/sense processor operably connected to the first and second drive-sense circuits, respectively, and configured: (i) to control the first drive-sense circuits to drive at least some of the first plurality of traces and to control the second drive-sense circuits to sense at least some of the mutual capacitances through the second plurality of traces, and (ii) to control the second drive-sense circuits to drive at least some of the second plurality of traces and to control the first drive-sense circuits to sense at least some of the Mutual capacitances through the first plurality of traces, the method comprising:

(a) driving the first plurality of electrically conductive traces through the first drive-sense circuits;

(b) sensing at least one first voltage associated with the mutual capacitances through the second plurality of electrically conductive traces and the second drive-sense circuits, and comparing the first voltage with a predetermined voltage threshold;

(c) driving the second plurality of electrically conductive traces through the second drive-sense circuits;

(d) sensing at least one second voltage associated with the mutual capacitances through the first plurality of electrically conductive traces and the first drive-sense circuits, and comparing the second voltage with the predetermined voltage threshold, and (e) detecting the locations of one or more touches on the touchscreen on the basis that if the first voltage or the second voltage exceed the predetermined voltage threshold or not.

28. The method of claim 27, further comprising driving substantially simultaneously the first plurality of electrically conductive traces through the first or second drive-sense circuits.

29. The method of claim 27, further comprising driving substantially simultaneously the second plurality of electrically conductive traces through the first or second drive-sense circuits.

30. The method of claim 27, further comprising sensing, substantially simultaneously at least some of the mutual capacitances through the first drive-sense circuits.

31. The method of claim 27, further comprising sensing substantially simultaneously at least some of the mutual capacitances through the second drive-sense circuits.

32. The method of claim 27, wherein sensing comprises detecting voltages associated with mutual capacitances.

33. The method of claim 27, further comprising detecting the locations of multiple simultaneous or near-simultaneous touches on the touchscreen through comparators detecting voltages associated with the mutual capacitances corresponding thereto.

34. The method of claim 27, further comprising driving selected ones of the first and second drive-sense circuits on the basis of the locations of touches that have already been detected.

35. The method of claim 27, further comprising controlling sensing selected ones of the first and second drive-sense circuits on the basis of locations of touches that have already been detected.

36. The method of claim 27, further comprising generating tags associated with the locations of detected touches.

37. The method of claim 27, further comprising generating tags associated with the magnitudes of detected touches.

38. The capacitive touchscreen system of claim 27, wherein the first drive-sense circuits comprises at least first drive-sense module respectively with a first signal path, wherein the second drive-sense circuits comprise at least second drive-sense module respectively with a second signal path, wherein the method of detecting touches on a capacitive touchscreen system comprises:

performs driving via a corresponding one of the first signal paths of the first drive-sense module while the first drive-sense circuit performing driving;

performs sensing via the corresponding one of the first signal paths of the first drive-sense module while the first drive-sense circuit performing sensing;

performs driving via a corresponding one of the second signal paths of the second drive-sense module while the second drive-sense circuit performing driving;

performs sensing via the corresponding one of the second signal paths of the second drive-sense module while the second drive-sense circuit performing sensing.

* * * * *